(12) United States Patent
Hogan et al.

(10) Patent No.: US 7,504,457 B2
(45) Date of Patent: Mar. 17, 2009

(54) FUNCTIONALIZED POLYMERS AND IMPROVED TIRES THEREFROM

(75) Inventors: Terrence E. Hogan, Akron, OH (US); Christine Rademacher, Akron, OH (US); David F. Lawson, Uniontown, OH (US); H. James Harwood, Stow, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 486 days.

(21) Appl. No.: 11/331,635

(22) Filed: Jan. 13, 2006

(65) Prior Publication Data

US 2006/0173138 A1    Aug. 3, 2006

Related U.S. Application Data

(60) Provisional application No. 60/644,168, filed on Jan. 14, 2005.

(51) Int. Cl.
    *C08G 61/02* (2006.01)
(52) U.S. Cl. .................. 525/55; 526/335; 526/346
(58) Field of Classification Search ........... 525/55; 526/335, 346
    See application file for complete search history.

(56) References Cited

U.S. PATENT DOCUMENTS

| | | | |
|---|---|---|---|
| 3,146,250 A | 8/1964 | Speier | 260/448.2 |
| 6,448,353 B1 * | 9/2002 | Nelson et al. | 526/265 |
| 6,750,309 B1 | 6/2004 | Chu et al. | 528/28 |
| 7,342,070 B2 | 3/2008 | Tsukimawashi et al. | |
| 2004/0254301 A1 * | 12/2004 | Tsukimawashi et al. | 525/271 |
| 2006/0135701 A1 | 6/2006 | Lawson et al. | 525/331.9 |
| 2007/0149749 A1 | 6/2007 | Yan et al. | 525/38 |

FOREIGN PATENT DOCUMENTS

| EP | 1457501 | 9/2004 |
|---|---|---|
| WO | WO 2006076629 A1 | 7/2006 |

OTHER PUBLICATIONS

International Preliminary Report on Patentability issued Jul. 17, 2007, International application No. PCT/US2006/001323, International filing date Jan. 12, 2006.

* cited by examiner

*Primary Examiner*—Kuo-Liang Peng
(74) *Attorney, Agent, or Firm*—Arthur M. Reginelli; Meredith E. Hooker

(57) ABSTRACT

A method of forming a functionalized polymer, the method comprising reacting a living polymer with a compound defined by the formula

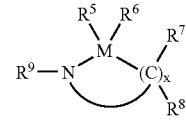

where $R^5$ includes a monovalent organic group, $R^6$ independently includes a monovalent organic group, each $R^7$ independently includes hydrogen or a monovalent organic group, each $R^8$ independently includes hydrogen or monovalent organic group, $R^9$ includes a monovalent organic group, M is silicon or tin, and x includes an integer from about 2 to about 10, where $R^5$ and $R^6$ may optionally each independently be alkoxy groups, and where $R^7$, $R^8$, and $R^9$ are non-Zerewitinoff organic groups.

15 Claims, No Drawings

FUNCTIONALIZED POLYMERS AND IMPROVED TIRES THEREFROM

This application gains benefit from U.S. Provisional Application No. 60/644,168, filed Jan. 14, 2005, which is incorporated herein by reference.

FIELD OF THE INVENTION

One or more embodiments of this invention relate to functionalized polymers and their use in the manufacture of tires particularly tire treads exhibiting reduced rolling resistance.

BACKGROUND OF THE INVENTION

In the art of making tires, it is desirable to employ rubber vulcanizates that demonstrate reduced hysteresis loss, i.e., less loss of mechanical energy to heat. Hysteresis loss is often attributed to polymer free ends within the cross-linked rubber network, as well as the disassociation of filler agglomerates. The degree of dispersion of filler within the vulcanizate is also important, as increased dispersion provides better wear resistance.

Functionalized polymers have been employed to reduce hysteresis loss and increase bound rubber. The functional group of the functionalized polymer is believed to reduce the number of free chain ends via interaction with filler particles. Also, the functional group is believed to reduce filler agglomeration, which thereby reduces hysteretic losses attributable to the disassociation of filler agglomerates (i.e., Payne effect).

Conjugated diene monomers are often anionically polymerized by using alkyllithium compounds as initiators. Selection of certain alkyllithium compounds can provide a polymer product having functionality at the head of the polymer chain. A functional group can also be attached to the tail end of an anionically-polymerized polymer by terminating a living polymer with a functionalized compound.

For example, trialkyltin chlorides, such as tributyl tin chloride, have been employed to terminate the polymerization of conjugated dienes, as well as the copolymerization of conjugated dienes and vinyl aromatic monomers, to produce polymers having a trialkyltin functionality at the tail end of the polymer. These polymers have proven to be technologically useful in the manufacture of tire treads that are characterized by improved traction, low rolling resistance, and improved wear.

Because functionalized polymers are advantageous, especially in the preparation of tire compositions, there exists a need for additional functionalized polymers.

SUMMARY OF THE INVENTION

In general the present invention provides a method of forming a functionalized polymer, the method comprising reacting a living polymer with a compound defined by the formula

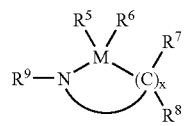

where $R^5$ includes a monovalent organic group, $R^6$ independently includes a monovalent organic group, each $R^7$ independently includes hydrogen or a monovalent organic group, each $R^8$ independently includes hydrogen or monovalent organic group, $R^9$ includes a monovalent organic group, M is silicon or tin, and x includes an integer from about 2 to about 10, where $R^5$ and $R^6$ may optionally each independently be alkoxy groups, and where $R^7$, $R^8$, and $R^9$ are non-Zerewitinoff organic groups.

The present invention further provides a functionalized polymer defined by the formula:

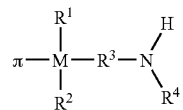

where π includes a polymer chain, $R^1$ includes a monovalent organic group, $R^2$ includes a monovalent organic group or a hydroxy group, $R^3$ includes a divalent organic group, $R^4$ includes a monovalent organic group, and M includes silicon (Si) or tin (Sn).

DETAILED DESCRIPTION OF ILLUSTRATIVE EMBODIMENTS

The functionalized polymers that are useful in the manufacture of tires include a primary or secondary amine group and a silicon-containing or tin-containing group at or near at least one end of a polymer chain. In one embodiment, the functionalized polymers are employed in the manufacture of tire treads, and as a result tires having reduced rolling resistance can be prepared.

In one or more embodiments, the functionalized polymers can be defined by the formula I

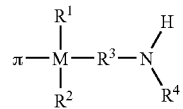

where π includes a polymer chain, $R^1$ includes a monovalent organic group, $R^2$ includes a monovalent organic group or a hydroxy group, $R^3$ includes a divalent organic group, $R^4$ includes a monovalent organic group, and M includes silicon (Si) or tin (Sn).

In one or more embodiments, the polymer chain (π) of the functionalized polymer includes an unsaturated polymer, which may also be referred to as a rubbery polymer. The polymer chain substituent can have a glass transition temperature ($T_g$) that is less than 0° C., in other embodiments less than −20° C., and in other embodiments less than −30° C. In one embodiment, the rubbery polymer chain exhibits a single glass transition temperature.

Included are anionically polymerized polymers. Examples include polybutadiene, polyisoprene, poly(styrene-co-butadiene), poly(styrene-co-butadiene-co-isoprene), poly(isoprene-co-styrene), and poly(butadiene-co-isoprene).

In one or more embodiments, the polymer chain has a number average molecular weight ($M_n$) of from about 5 to about 1,000 kg/mole, in other embodiments from about 50 to about 500 kg/mole, and in other embodiments 100 to about 300 kg/mole, as measured by using Gel Permeation Chromatography (GPC) calibrated with polystyrene standards and adjusted for the Mark-Houwink constants for the polymer in question.

In one or more embodiments, the monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms.

Alkoxy groups include hetero atom-containing organic groups. In one or more embodiments, alkoxy groups can be defined by the formula —OR, where R includes a monovalent organic group. In one embodiment, R is an alkyl group including 1 to about 10 carbon atoms. For example, the alkoxy group may include a methoxy, ethoxy, or propoxy group. In other embodiments, the organic groups (or hydrocarbyl groups) are devoid of hetero atoms that will render the group reactive with a living polymer. As an example, the group will not act as a leaving group in a nucleophilic reaction. Those organic or hydrocarbyl groups that do not react with living polymers may be referred to as non-Zerewitinoff organic groups or hydrocarbyl groups.

In one or more embodiments, divalent organic groups may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms. In one or more embodiments, the divalent organic group will not react with a living polymer.

In one or more embodiments, $R^1$ and $R^2$ may each individually be an alkyl group including from about 1 to about 10 carbon atoms, and in other embodiments include less than 7 carbon atoms. In certain embodiments, $R^1$ and $R^2$ may each individually be an alkoxy group including from about 1 to about 10 carbon atoms, and in other embodiments include alkoxy groups including less than 7 carbon atoms. In one or more embodiments, one of $R^1$ and $R^2$ is an alkyl group and the other of $R^1$ and $R^2$ is an alkoxy group.

In one or more embodiments, $R^3$ is an alkylene or substituted alkylene group including from about 1 to about 10 carbon atoms, and in other embodiments less than 7 carbon atoms.

In one or more embodiments, $R^4$ is an alkyl group including from 1 to about 20 carbon atoms, in other embodiments, less than 12 carbon atoms, and in other embodiments less than 8 carbon atoms.

In one or more embodiments, the functionalized polymer includes a functional group at the head of the polymer; i.e., at an end other than that including the tin or silicon atom or functionality. This functionalized polymer can be defined by the formula II

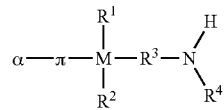

where α is a functionality or functional group that reacts or interacts with rubber or rubber fillers or otherwise has a desirable impact on filled rubber compositions or vulcanizates, π, $R^1$, $R^2$, $R^3$, and $R^4$ are as described above, and M includes silicon (Si) or tin (Sn). In one or more embodiments, α reduces the 50° C. hysteresis loss of vulcanizates including the functionalized polymer when compared to similar vulcanizates with polymer not including α (i.e., a comparable polymer without α).

Those groups or substituents that react or interact with rubber or rubber fillers or otherwise have a desirable impact on filled rubber compositions or vulcanizates are known and may include trialkyl tin substituents, cyclic amine groups, or aryl or alkyl thio acetals. Exemplary trialkyl tin substituents are disclosed in U.S. Pat. No. 5,268,439, which is incorporated herein by reference. Exemplary cyclic amine groups are disclosed in U.S. Pat. Nos. 6,080,853, 5,786,448, 6,025,450, and 6,046,288, which are incorporated herein by reference. Exemplary aryl or alkyl thio acetals (e.g., dithianes) are disclosed in International Publication No. WO 2004/041870, which is incorporated herein by reference.

In one embodiment, the functionalized polymers may be prepared by reacting or terminating a living polymer with an cyclicaminohetero compound, which may also be referred to as a cyclic azagilacycle or cyclic azastannacycle (they may also be referred to simply as a functionalizing agent).

In one embodiment, the cyclicaminohetero compound may be defined by the formula III

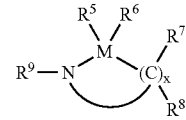

where $R^5$ includes a monovalent organic group, $R^6$ independently includes a monovalent organic group, each $R^7$ independently includes hydrogen or a monovalent organic group, each $R^8$ independently includes hydrogen or monovalent organic group, $R^9$ includes a monovalent organic group, M is silicon or tin, and x includes an integer from about 2 to about 10, where $R^5$ and $R^6$ may optionally each independently be alkoxy groups, and where $R^7$, $R^8$, and $R^9$ are non-Zerewitinoff organic groups.

In one or more embodiments, $R^5$ and $R^6$ may each individually be an alkyl group including from about 1 to about 10 carbon atoms, and in other embodiments include less than 7 carbon atoms. In certain embodiments, $R^5$ and $R^6$ may each individually be an alkoxy group including from about 1 to about 10 carbon atoms, and in other embodiments include alkoxy groups including less than 7 carbon atoms. In one or more embodiments, one of $R^5$ and $R^6$ is an alkyl group and the other of $R^5$ and $R^6$ is an alkoxy group.

In one or more embodiments, $R^7$ and $R^8$ may each individually be an alkyl group including less than 10 carbon atoms, and in other embodiments include less than 7 carbon atoms. In certain embodiments, $R^7$ and $R^8$ are both hydrogen.

In other embodiments, one of $R^7$ and $R^8$ is hydrogen and the other of $R^7$ and $R^8$ is an alkyl group.

In one or more embodiments, $R^9$ is an alkyl group including from 1 to about 20 carbon atoms, in other embodiments, less than 12 carbon atoms, and in other embodiments less than 8 carbon atoms.

Useful types of compounds include cyclicaminodialkoxysilanes, cyclicaminodialkoxystannanes, cyclicaminodialkylsilanes, cyclicaminodialkylstannanes, cyclicaminoaklylalkoxysilanes, cyclicaminoalkylalkoxystannanes, and mixtures thereof. The dialkyl and dialkoxy compounds include those compounds where the substituents of the hetero atom (i.e., $R^5$ and $R^6$) are either both alkoxy groups or both alkyl groups. The alkylalkoxy compounds include those compounds where one of the substituents of the hetero atom is alkoxy and the other is alkyl.

Examples of cyclicaminodialkoxysilanes include N-methyl-aza-2,2-dimethoxysilacyclopentane, N-ethyl-aza-2,2-dimethoxysilacyclopentane, N-n-propyl-aza-2,2-dimethoxysilacyclopentane, N-n-butyl-aza-2,2-dimethoxysilacyclopentane, N-methyl-aza-2,2-diethoxysilacyclopentane, N-ethyl-aza-2,2-diethoxysilacyclopentane, N-n-propyl-aza-2,2-diethoxysilacyclopentane, N-n-butyl-aza-2,2-diethoxysilacyclopentane, N-methyl-aza-2,2-dipropoxysilacyclopentane, N-ethyl-aza-2,2-dipropoxysilacyclopentane, N-n-propyl-aza-2,2-dipropoxysilacyclopentane, N-n-butyl-aza-2,2-dipropoxysilacyclopentane, N-methyl-aza-2,2-dibutoxysilacyclopentane, N-ethyl-aza-2,2-dibutoxysilacyclopentane, N-n-propyl-aza-2,2-dibutoxysilacyclopentane, N-n-butyl-aza-2,2-dibutoxysilacyclopentane, N-methyl-aza-2-ethoxy-2-methoxysilacyclopentane, N-ethyl-aza-2-butoxy-2-ethoxysilacyclopentane, N-n-propyl-aza-2-methoxy-2-propoxysilacyclopentane, N-n-butyl-aza-2-propoxy-2-ethoxysilacyclopentane, N-methyl-aza-2-butoxy-2-methoxysilacyclopentane, N-ethyl-aza-2-propoxy-2-ethoxysilacyclopentane, N-n-propyl-aza-2-butoxy-2-propoxysilacyclopentane, N-n-butyl-aza-2-methoxy-2-ethoxysilacyclopentane, N-methyl-aza-2,2-dimethoxysilacyclobutane, N-ethyl-aza-2,2-dimethoxysilacyclobutane, N-n-propyl-aza-2,2-dimethoxysilacyclobutane, N-n-butyl-aza-2,2-dimethoxysilacyclobutane, N-methyl-aza-2,2-diethoxysilacyclobutane, N-ethyl-aza-2,2-diethoxysilacyclobutane, N-n-propyl-aza-2,2-diethoxysilacyclobutane, N-n-butyl-aza-2,2-diethoxysilacyclobutane, N-methyl-aza-2,2-dipropoxysilacyclobutane, N-ethyl-aza-2,2-dipropoxysilacyclobutane, N-n-propyl-aza-2,2-dipropoxysilacyclobutane, N-n-butyl-aza-2,2-dipropoxysilacyclobutane, N-methyl-aza-2,2-dibutoxysilacyclobutane, N-ethyl-aza-2,2-dibutoxysilacyclobutane, N-n-propyl-aza-2,2-dibutoxysilacyclobutane, N-n-butyl-aza-2,2-dibutoxysilacyclobutane, N-methyl-aza-2-ethoxy-2-methoxysilacyclobutane, N-ethyl-aza-2-butoxy-2-ethoxysilacyclobutane, N-n-propyl-aza-2-methoxy-2-propoxysilacyclobutane, N-n-butyl-aza-2-propoxy-2-ethoxysilacyclobutane, N-methyl-aza-2-butoxy-2-methoxysilacyclobutane, N-ethyl-aza-2-propoxy-2-ethoxysilacyclobutane, N-n-propyl-aza-2-butoxy-2-propoxysilacyclobutane, N-n-butyl-aza-2-methoxy-2-ethoxysilacyclobutane, N-methyl-aza-2,2-dimethoxysilacyclohexane, N-ethyl-aza-2,2-dimethoxysilacyclohexane, N-n-propyl-aza-2,2-dimethoxysilacyclohexane, N-n-butyl-aza-2,2-dimethoxysilacyclohexane, N-methyl-aza-2,2-diethoxysilacyclohexane, N-ethyl-aza-2,2-diethoxysilacyclohexane, N-n-propyl-aza-2,2-diethoxysilacyclohexane, N-n-butyl-aza-2,2-diethoxysilacyclohexane, N-methyl-aza-2,2-diethoxysilacyclohexane, N-ethyl-aza-2,2-dipropoxysilacyclohexane, N-n-propyl-aza-2,2-dipropoxysilacyclohexane, N-n-butyl-aza-2,2-dipropoxysilacyclohexane, N-methyl-aza-2,2-dipropoxysilacyclohexane, N-ethyl-aza-2,2-dibutoxysilacyclohexane, N-n-propyl-aza-2,2-dibutoxysilacyclohexane, N-n-butyl-aza-2,2-dibutoxysilacyclohexane, N-methyl-aza-2-ethoxy-2-methoxysilacyclohexane, N-ethyl-aza-2-butoxy-2-ethoxysilacyclohexane, N-n-propyl-aza-2-methoxy-2-propoxysilacyclohexane, N-n-butyl-aza-2-propoxy-2-ethoxysilacyclohexane, N-methyl-aza-2-butoxy-2-methoxysilacyclohexane, N-ethyl-aza-2-propoxy-2-ethoxysilacyclohexane, N-n-propyl-aza-2-butoxy-2-propoxysilacyclohexane, or N-n-butyl-aza-2-methoxy-2-ethoxysilacyclohexane.

In addition to the foregoing, the silacycloheptane, and silacyclooctane, and silacyclononane derivatives of these silane compounds are useful and are contemplated by the present invention. Also, the equivalent stannanes are also contemplated, and their names can be derived by those skilled in the art without undo calculation or experimentation. For example, the equivalent stannane to N-n-butyl-aza-2-methoxy-2-ethoxysilacyclohexane is N-n-butyl-aza-2-methoxy-2-ethoxystannacyclohexane.

Examples of cyclicaminodialkylsilanes include N-methyl-aza-2,2-dimethylsilacyclopentane, N-ethyl-aza-2,2-dimethylsilacyclopentane, N-n-propyl-aza-2,2-dimethylsilacyclopentane, N-n-butyl-aza-2,2-dimethylsilacyclopentane, N-methyl-aza-2,2-diethylsilacyclopentane, N-ethyl-aza-2,2-diethylsilacyclopentane, N-n-propyl-aza-2,2-diethylsilacyclopentane, N-n-butyl-aza-2,2-diethylsilacyclopentane, N-methyl-aza-2,2-dipropylsilacyclopentane, N-ethyl-aza-2,2-dipropylsilacyclopentane, N-n-propyl-aza-2,2-dipropylsilacyclopentane, N-n-butyl-aza-2,2-dipropylsilacyclopentane, N-methyl-aza-2,2-dibutylsilacyclopentane, N-ethyl-aza-2,2-dibutylsilacyclopentane, N-n-propyl-aza-2,2-dibutylsilacyclopentane, N-n-butyl-aza-2,2-dibutylsilacyclopentane, N-methyl-aza-2-ethyl-2-methylsilacyclopentane, N-ethyl-aza-2-butyl-2-ethylsilacyclopentane, N-n-propyl-aza-2-methyl-2-propylsilacyclopentane, N-n-butyl-aza-2-propyl-2-ethylsilacyclopentane, N-methyl-aza-2-butyl-2-methylsilacyclopentane, N-ethyl-aza-2-propyl-2-ethylsilacyclopentane, N-n-propyl-aza-2-butyl-2-propylsilacyclopentane, N-n-butyl-aza-2-methyl-2-ethylsilacyclopentane, N-methyl-aza-2,2-dimethylsilacyclobutane, N-ethyl-aza-2,2-dimethylsilacyclobutane, N-n-propyl-aza-2,2-dimethylsilacyclobutane, N-n-butyl-aza-2,2-dimethylsilacyclobutane, N-methyl-aza-2,2-dimethylsilacyclobutane, N-ethyl-aza-2,2-diethylsilacyclobutane, N-n-propyl-aza-2,2-diethylsilacyclobutane, N-n-butyl-aza-2,2-diethylsilacyclobutane, N-methyl-aza-2,2-diethylsilacyclobutane, N-ethyl-aza-2,2-dipropylsilacyclobutane, N-n-propyl-aza-2,2-dipropylsilacyclobutane, N-n-butyl-aza-2,2-dipropylsilacyclobutane, N-methyl-aza-2,2-dipropylsilacyclobutane, N-ethyl-aza-2,2-dibutylsilacyclobutane, N-n-propyl-aza-2,2-dibutylsilacyclobutane, dibutylsilacyclobutane,
dibutylsilacyclobutane,
methylsilacyclobutane,
ethylsilacyclobutane,
propylsilacyclobutane,
ethylsilacyclobutane,
methylsilacyclobutane,
ethylsilacyclobutane,
propylsilacyclobutane,
ethylsilacyclobutane,
dimethylsilacyclohexane,
dimethylsilacyclohexane,
dimethylsilacyclohexane,
dimethylsilacyclohexane,
diethylsilacyclohexane,
diethylsilacyclohexane,
diethylsilacyclohexane,
diethylsilacyclohexane,
dipropylsilacyclohexane,
dipropylsilacyclohexane,
dipropylsilacyclohexane,
dipropylsilacyclohexane,
dibutylsilacyclohexane,
dibutylsilacyclohexane,
dibutylsilacyclohexane,
dibutylsilacyclohexane,
methylsilacyclohexane,
ethylsilacyclohexane,
propylsilacyclohexane,
ethylsilacyclohexane,
methylsilacyclohexane,
ethylsilacyclohexane,
propylsilacyclohexane, or
ethylsilacyclohexane.
N-n-butyl-aza-2,2-
N-methyl-aza-2-ethyl-2-
N-ethyl-aza-2-butyl-2-
N-n-propyl-aza-2-methyl-2-
N-n-butyl-aza-2-propyl-2-
N-methyl-aza-2-butyl-2-
N-ethyl-aza-2-propyl-2-
N-n-propyl-aza-2-butyl-2-
N-n-butyl-aza-2-methyl-2-
N-methyl-aza-2,2-
N-ethyl-aza-2,2-
N-n-propyl-aza-2,2-
N-n-butyl-aza-2,2-
N-methyl-aza-2,2-
N-ethyl-aza-2,2-
N-n-propyl-aza-2,2-
N-n-butyl-aza-2,2-
N-methyl-aza-2,2-
N-ethyl-aza-2,2-
N-n-propyl-aza-2,2-
N-n-butyl-aza-2,2-
N-methyl-aza-2,2-
N-ethyl-aza-2,2-
N-n-propyl-aza-2,2-
N-n-butyl-aza-2,2-
N-methyl-aza-2-ethyl-2-
N-ethyl-aza-2-butyl-2-
N-n-propyl-aza-2-methyl-2-
N-n-butyl-aza-2-propyl-2-
N-methyl-aza-2-butyl-2-
N-ethyl-aza-2-propyl-2-
N-n-propyl-aza-2-butyl-2-
N-n-butyl-aza-2-methyl-2-

In addition to the foregoing, the silacycloheptane, and silacyclooctane, and silacyclononane derivatives of these silane compounds are useful and are contemplated by the present invention. Also, the equivalent stannanes are also contemplated, and their names can be derived by those skilled in the art without undo calculation or experimentation. For example, the equivalent stannane to N-n-butyl-aza-2-methyl-2-ethylsilacyclohexane is N-n-butyl-aza-2-methyl-2-ethylstannacyclohexane.

Examples of cyclicaminoalkoxyalkylsilanes include N-methyl-aza-2-methoxy-2-methylsilacyclopentane, N-ethyl-aza:2-methoxy-2-methylsilacyclopentane, N-n-propyl-aza-2-methoxy-2-methylsilacyclopentane, N-n-butyl-aza-2-methoxy-2-methylsilacyclopentane, N-methyl-aza-2-ethoxy-2-ethylsilacyclopentane, N-ethyl-aza-2-ethoxy-2-ethylsilacyclopentane,
N-n-propyl-aza-2-ethoxy-2-ethylsilacyclopentane,
N-n-butyl-aza-2-ethoxy-2-ethylsilacyclopentane,
N-methyl-aza-2-propoxy-2-propylsilacyclopentane,
N-ethyl-aza-2-propoxy-2-propylsilacyclopentane,
N-n-propyl-aza-2-propoxy-2-propylsilacyclopentane,
N-n-butyl-aza-2-propoxy-2-propylsilacyclopentane,
N-methyl-aza-2-propoxy-2-butylsilacyclopentane,
N-ethyl-aza-2-propoxy-2-butylsilacyclopentane,
N-n-propyl-aza-2-propoxy-2-butylsilacyclopentane,
N-n-butyl-aza-2-propoxy-2-butylsilacyclopentane,
N-methyl-aza-2-ethoxy-2-methylsilacyclopentane,
N-ethyl-aza-2-butoxy-2-ethylsilacyclopentane,
N-n-propyl-aza-2-methoxy-2-propylsilacyclopentane,
N-n-butyl-aza-2-propoxy-2-ethylsilacyclopentane,
N-methyl-aza-2-butoxy-2-methylsilacyclopentane,
N-ethyl-aza-2-propoxyl-2-ethylsilacyclopentane,
N-n-propyl-aza-2-butoxy-2-propylsilacyclopentane,
N-n-butyl-aza-2-methoxy-2-ethylsilacyclopentane,
N-methyl-aza-2-methoxy-2-methylsilacyclobutane,
N-ethyl-aza-2-methoxy-2-methylsilacyclobutane,
N-n-propyl-aza-2-methoxy-2-methylsilacyclobutane,
N-n-butyl-aza-2-methoxy-2-methylsilacyclobutane,
N-methyl-aza-2-ethoxy-2-ethylsilacyclobutane,
N-ethyl-aza-2-ethoxy-2-ethylsilacyclobutane,
N-n-propyl-aza-2-ethoxy-2-ethylsilacyclobutane,
N-n-butyl-aza-2-ethoxy-2-ethylsilacyclobutane,
N-methyl-aza-2-propoxy-2-propylsilacyclobutane,
N-ethyl-aza-2-propoxy-2-propylsilacyclobutane,
N-n-propyl-aza-2-propoxy-2-propylsilacyclobutane,
N-n-butyl-aza-2-propoxy-2-propylsilacyclobutane,
N-methyl-aza-2-butoxy-2-butylsilacyclobutane,
N-ethyl-aza-2-butoxy-2-butylsilacyclobutane,
N-n-propyl-aza-2-butoxy-2-butylsilacyclobutane,
N-n-butyl-aza-2-butoxy-2-butylsilacyclobutane,
N-methyl-aza-2-ethoxy-2-methylsilacyclobutane,
N-ethyl-aza-2-butoxy-2-ethylsilacyclobutane,
N-n-propyl-aza-2-methoxy-2-propylsilacyclobutane,
N-n-butyl-aza-2-propoxy-2-ethylsilacyclobutane,
N-methyl-aza-2-butoxy-2-methylsilacyclobutane,
N-ethyl-aza-2-propoxy-2-ethylsilacyclobutane,
N-n-propyl-aza-2-butoxy-2-propylsilacyclobutane,
N-n-butyl-aza-2-methoxy-2-ethylsilacyclobutane,
N-methyl-aza-2-methoxy-2-methylsilacyclohexane,
N-ethyl-aza-2-methoxy-2-methylsilacyclohexane,
N-n-propyl-aza-2-methoxy-2-methylsilacyclohexane,
N-n-butyl-aza-2-methoxy-2-methylsilacyclohexane,
N-methyl-aza-2-ethoxy-2-ethylsilacyclohexane,
N-ethyl-aza-2-ethoxy-2-ethylsilacyclohexane,
N-n-propyl-aza-2-ethoxy-2-ethylsilacyclohexane,
N-n-butyl-aza-2-ethoxy-2-ethylsilacyclohexane,
N-methyl-aza-2-propoxy-2-propylsilacyclohexane,
N-ethyl-aza-2-propoxy-2-propylsilacyclohexane,
N-n-propyl-aza-2-propoxy-2-propylsilacyclohexane,
N-n-butyl-aza-2-propoxy-2-propylsilacyclohexane,
N-methyl-aza-2-butoxy-2-butylsilacyclohexane,
N-ethyl-aza-2-butoxy-2-butylsilacyclohexane,
N-n-propyl-aza-2-butoxy-2-butylsilacyclohexane,
N-n-butyl-aza-2-butoxy-2-butylsilacyclohexane,
N-methyl-aza-2-ethoxy-2-methylsilacyclohexane,
N-ethyl-aza-2-butoxy-2-ethylsilacyclohexane,
N-n-propyl-aza-2-methoxy-2-propylsilacyclohexane,
N-n-butyl-aza-2-propoxy-2-ethylsilacyclohexane,
N-methyl-aza-2-butoxyl-2-methylsilacyclohexane,
N-ethyl-aza-2-propoxy-2-ethylsilacyclohexane,
N-n-propyl-aza-2-butoxyl-2-propylsilacyclohexane, or N-n-butyl-aza-2-methoxy-2-ethylsilacyclohexane.

In addition to the foregoing, the silacycloheptane, and silacyclooctane, and silacyclononane derivatives of these silane compounds are useful and are contemplated by the present invention. Also, the equivalent stannanes are also contemplated, and their names can be derived by those skilled in the art without undo calculation or experimentation. For example, the equivalent stannane to N-n-butyl-aza-2-methoxy-2-ethylsilacyclohexane is N-n-butyl-aza-2-methoxy-2-ethylstannacyclohexane.

In one ore more embodiments, living polymers include anionically polymerized polymers. Anionically-polymerized living polymers may be formed by reacting anionic initiators with certain unsaturated monomers to propagate a polymeric structure. Throughout formation and propagation of the polymer, the polymeric structure may be anionic and "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 (3$^{rd}$ Ed. 1991), or Panek, 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, a-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Still others include alkylthioacetals (e.g., dithianes). Exemplary initiators are also described in the following U.S. Pat. Nos. 5,332,810, 5,329,005, 5,578,542, 5,393,721, 5,698,646, 5,491,230, 5,521,309, 5,496,940, 5,574,109, 5,786,441, and International Publication Nos. WO 2004/020475 and WO 2004/041870, which are incorporated herein by reference.

The amount of initiator employed in conducting anionic polymerizations can vary widely based upon the desired polymer characteristics. In one or more embodiments, from about 0.1 to about 100, and optionally from about 0.33 to about 10 mmol of lithium per 100 g of monomer is employed.

Anionic polymerizations are typically conducted as a solution polymerization in a polar solvent such as tetrahydrofuran (THF) or a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl) propane, di-piperidyl ethane, dipiperidyl methane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

Anionically polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 130° C. and the polymerization is allowed to proceed for from about 0.1 to about 24 hours. This reaction produces a reactive polymer having a reactive or living end. Preferably, at least about 30% of the polymer molecules contain a living end. More preferably, at least about 50% of the polymer molecules contain a living end. Even more preferably, at least about 80% contain a living end.

In one or more embodiments, the functionalizing agent (e.g., cyclicaminoalkoxysilane) is reacted with the living polymer end. This reaction can be achieved by simply mixing the functionalizing agent with the living polymer. The reaction may occur in solution; for example, the functionalizing agent may be added to the solution containing the living polymer. Without intending to be bound to any particular theory, it is believed that the anionic-living polymer reacts with the cyclicaminohetero compound via a nucleophilic substitution reaction. This reaction can include the displacement of an alkoxy group from the hetero atom of the cyclicaminohetero compound or the displacement of the nitrogen-hetero bond within the cyclicaminohetero compound.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent may be added within about 25 to 35 minutes of the peak polymerization temperature.

The amount of functionalizing agent employed to prepare the functionalized polymers is best described with respect to the equivalents of lithium or metal cation associated with the initiator. For example, where a lithium initiator is employed, the moles of functionalizing agent per mole of lithium may be about 0.3 to about 2, optionally from about 0.6 to about 1.5, optionally from about 0.7 to about 1.3, and optionally from about 0.8 to about 1.1.

In certain embodiments, the functionalizing agent can be employed in combination with other coupling or terminating agents. The combination of functionalizing agent with other terminating agent or coupling agent can be in any molar ratio. The coupling agents that can be employed in combination with the functionalizing agent include any of those coupling agents known in the art including, but not limited to, tin tetrachloride, tetraethyl ortho silicate, and tetraethoxy tin, and silicon tetrachloride. Likewise, any terminating agent can be employed in combination with the functionalizing agent (i.e., the cyclicaminoalkoxysilane) including, but not limited to, tributyltin chloride. In certain embodiments, a proton source or quenching agent (e.g., isopropyl alcohol or water) may be added to the solution after addition of the functionalizing agent.

After formation of the functional polymer, a processing aid and other optional additives such as oil can be added to the polymer cement. The functional polymer and other optional ingredients may then be isolated from the solvent and optionally dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

The functionalized polymers of this invention are particularly useful in preparing tire components. These tire components can be prepared by using the functionalized polymers of this invention alone or together with other rubbery polymers. Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more $\alpha$-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in 20 *Kirk-Othmer, Encyclopedia of Chemical Technology*, 365-468, ($3^{rd}$ Ed. 1982), particularly *Vulcanization Agents and Auxiliary Materials*, 390-402, and A.Y. Coran, *Vulcanization in Encyclopedia of Polymer Science and Engineering*, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, black sidewalls, body ply skins, bead filler, and the like. Preferably, the functional polymers are employed in tread formulations. In one or more embodiments, these tread formulations may include from about 10 to about 100% by weight, in other embodiments from about 35 to about 90% by weight, and in other embodiments from about 50 to 80% by weight of the functional polymer based on the total weight of the rubber within the formulation. In one or more embodiments, the preparation of vulcanizable compositions and the construction and curing of the tire is not affected by the practice of this invention.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functionalized polymer of this invention can be added during these remills. Rubber compounding techniques and the additives employed therein are generally known as disclosed in Stephens, *The Compounding and Vulcanization of Rubber*, in *Rubber Technology* ($2^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents. It is believed that this procedure will enhance the opportunity that the functionalized polymer will react or interact with silica before competing with coupling or shielding agents, which can be added later curing remills.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Experiment 1

A living polymer cement was prepared by charging a 5-gallon reactor with 4.89 kg of technical hexanes, 1.20 g of a 34% solution of styrene/hexane blend, and 7.44 kg of a 21% 1,3-butadiene/hexane blend. 2,2-bis(2'-tetra hydrofuryl)propane polar randomizer (about 0.3 equivalents per equivalent of lithium) and n-butyllithium initiator (12.05 mL of a 1.54 molar solution) were subsequently charged. The reactor was heated in batch mode to 49° C. The reaction exothermed to 65° C. within 30 minutes and batch was cooled to about 32° C. after one hour. The resulting cement was then apportioned to bottles that were dried, nitrogen purged, and ultimately capped for subsequent termination reaction. The isolated polymer had the following properties: Mn=100.3 kg/mol, Mw=103.7 kg/mol, and $T_g$=−31.6° C.

A first bottle of polymer cement was employed to prepare a control (Sample 1). Isopropyl alcohol was used to both terminate and coagulate the polymer. The coagulated polymer was then drum dried.

Experiment 2

A second bottle prepared from the batch of Experiment 1 was employed to form a functionalized polymer. Specifically, 1.0 equivalent of N-n-butyl-aza-2,2-dimethoxysilacyclopentane per equivalent of lithium was added to the bottle and the bottle was then agitated for 30 minutes at 50° C. The functionalized polymer was then coagulated in isopropyl alcohol and drum dried. The isolated polymer had the following properties: $M_n$=138.9 kg/mol; $M_w$=218.6 kg/mol; and $T_g$=−31.6° C.

Experiment 3

The functionalized polymers prepared above were each employed to prepare separate tire formulations that included either a carbon black reinforcement or a silica and carbon black blend reinforcement (Mixed Silica). The polymer portion of each sample include 100% of the sample polymer (i.e., 100 parts by weight non-functionalized polymer were employed in those recipes where non-functionalized polymer was used). The recipes for the tire formulations are set forth in Table I.

TABLE I

| Ingredient | Carbon Black Formulation (phr) | Mixed Silica Formulation (phr) |
|---|---|---|
| Polymer (functionalized or non-functionalized) | 100 | 100 |
| Carbon Black | 55 | 35 |
| Silica | — | 30 |
| Antiozonant | 0.95 | 0.95 |
| Zinc Oxide | 2.5 | 2.5 |
| Stearic Acid | 2 | 1.5 |
| Oil | 10 | 10 |
| Wax | 1 | — |
| Coupling Agent | — | 4.57 |
| Sulfur | 1.3 | 1.7 |
| Accelerators | 1.9 | 2.25 |

The tire formulations were mixed using conventional mixing procedures. Namely, when preparing formulations that included carbon black reinforcement, the ingredients (excluding the sulfur and accelerators) were initially mixed at about 133° C. at 60 r.p.m. within a Banbury mixer. Sulfur and accelerators were subsequently added in a separate mixing step that was conducted at about 65° C. and 40r.p.m.

Where the formulations included both carbon black and silica, the ingredients (excluding sulfur, accelerators, binder, coupling agents, and zinc oxide) were mixed at about 168° C., the coupling agent was subsequently added and mixed at about 137° C. and 60 r.p.m., and the sulfur, accelerators, and zinc oxide were added in a subsequent mixing step and mixed at about 95° C. and 40 r.p.m.

The formulations were prepared into test specimens and cured within a closed cavity mold under pressure for 15 minutes at 171° C. The test specimens were then subjected to various physical tests, and the results of these tests are reported in Table II. The samples designated 1A and 2B included the non-functionalized polymer in the carbon black formulation (CB) and mixed silica formulation (blend), respectively. Likewise the samples designated 2A and 2B included the functionalized polymer in the carbon black formulation and mixed silica formulation, respectively.

TABLE II

| Formulation | 1A | 1B | 2A | 2B |
|---|---|---|---|---|
| Filler | CB | CB | BLEND | BLEND |
| Functionalized Polymer | No | Yes | No | Yes |
| $ML_{1+4}$ @ 130° C. | 20.7 | 43.6 | 56.0 | 103.5 |
| $T_5$ (min) | 23.8 | 19.2 | 36.5 | 28.9 |
| 300% Modulus @ 23° C. (MPa) | 6.04 | 9.60 | 9.57 | 12.32 |
| Tensile at Break @ 23° C. (MPa) | 8.52 | 11.37 | 14.93 | 18.78 |
| Elongation at Break @ 23° C. (%) | 512 | 356 | 442 | 428 |
| tan δ 5% @ 50° C. | 0.2605 | 0.1570 | 0.2377 | 0.1726 |
| ΔG' (MPa) @ 50° C. | 5.120 | 1.204 | 9.593 | 2.729 |
| tan δ 0.5% E, @ 0° C. | 0.2532 | 0.2828 | 0.2264 | 0.3111 |
| Shore A Peak @ 23° C. | 72.4 | 69.9 | 78.6 | 71.9 |

Mooney viscosity measurement was conducted at 130° C. using a large rotor. The Mooney viscosity was recorded as the torque when the rotor has rotated for 4 minutes. The sample is preheated at 130° C. for 1 minute before the rotor starts.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test. Heat aged data was obtained after heating the vulcanizates for 24 hours at 100° C.

Temperature sweep experiments were conducted with a frequency of 31.4 rad/sec using 0.5% strain for temperature ranging from −100° C. to −10° C., and 2% strain for the temperature ranging from −10° C. to 100° C. ΔG is the change in G' at 0.25% from G' at 14.00%. Payne effect (ΔG') data were obtained from the strain sweep experiment. A frequency of 6.28 rad/sec was used for strain sweep which is conducted at 50° C. with strain sweeping from 0.25% to 14.00%.

Various modifications and alterations that do not depart from the scope and spirit of this invention will become apparent to those skilled in the art. This invention is not to be duly limited to the illustrative embodiments set forth herein.

What is claimed is:

1. A method of forming a functionalized polymer, the method comprising:

reacting a living polymer with a compound defined by the formula

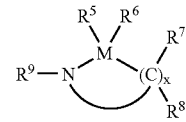

where $R^5$ includes a monovalent organic group, $R^6$ independently includes a monovalent organic group, each $R^7$ independently includes hydrogen or a monovalent organic group, each $R^8$ independently includes hydrogen or monovalent organic group, $R^9$ includes a hydrocarbyl group or a substituted hydrocarbyl group, M is silicon or tin, and x includes an integer from about 2 to about 10, where $R^5$ and $R^6$ may optionally each independently be alkoxy groups, and where $R^7$, $R^8$, and $R^9$ are non-Zerewitinoff organic groups.

2. The method of claim 1, where the living polymer has a glass transition temperature that is less than 0 °C.

3. The functionalized polymer of claim 2, where the living polymer is selected from the group consisting of polybutadiene, polyisoprene, poly(styrene-co-butadiene), poly(styrene-co-butadiene-co-isoprene), poly(isoprene-co-styrene), and poly(butadiene-co-isoprene).

4. The functionalized polymer of claim 2, where the living polymer has a number average molecular weight of from about 5 to 1,000 kg/mol.

5. The functionalized polymer of claim 1, where the living polymer includes a functionality or functional group at its head that reacts or interacts with rubber or rubber fillers or otherwise has a desirable impact on filled rubber compositions or vulcanizates.

6. The method of claim 1, where M is a silicon atom.

7. The method of claim 1, where M is a tin atom.

8. The method of claim 1, where $R^5$ and $R^6$ are each independently alkoxy groups.

9. The method of claim 1, where the functionalizing compound is selected from the group consisting of cyclicaminodloalkoxysilanes, cyclicaminodioalkoxystannanes, cyclicaminodialkylsilanes, cyclicaminodialkylstannanes, cyclicaminoaklylalkoxysilanes, cyclicaminoalkylalkoxystannanes, and mixtures thereof.

10. The method of claim 9, where the functionalizing compound is selected from the group consisting of N-methyl-aza-2,2-dimethoxysilacyclopentane, N-ethyl-aza-2,2-dimethoxysilacyclopentane, N-n-propyl-aza-2,2-dimethoxysilacyclopentane, N-n-butyl-aza-2,2-dimethoxysilacyclopentane, N-methyl-aza-2,2-diethoxysilacyclopentane, N-ethyl-aza-2,2-diethoxysilacyclopentane, N-n-propyl-aza-2,2-diethoxysilacyclopentane, N-n-butyl-aza-2,2-diethoxysilacyclopentane, N-Methyl -aza-2,2-dipropoxysilacyclopentane, N-ethyl-aza-2,2-dipropoxysilacyclopentane, N-n-propyl-aza-2,2-dipropoxysilacyclopentane, N-n-butyl-aza-2,2-dipropoxysilacyclopentane, N-rnethyl-aza-2,2-dibutoxysilacyclopentane, N-ethyl-aza-2,2-dibutoxysilacyclopentane, N-n-propyl-aza-2,2-dibutoxysilacyclopentane, N-n-butyl-aza-2,2-dibutoxysilacyclopentane, N-methyl-aza-2-ethoxy-2-methoxysilacyclopentane, N-ethyl -aza-2-butoxy-2-ethoxysilacyclopentane, N-n-propyl-aza-2-methoxy-2-propoxysilacyclopentane, N-n-butyl-aza-2-propoxy-2-ethoxysilacyclopentane, N-methyl aza-2-butoxy-2-methoxysilacyclopentane, N-ethyl-aza-2-propoxy-2-ethoxysilacyclopentane, N-n-propyl-aza-2-butoxy-2-propoxysilacyclopentane, and N-n-butyl -aza-2-methoxy-2-ethoxysilacyclopentane.

11. The method of claim 9, where the functionalizing compound is selected from the group consisting of N-methyl-aza-2,2-dimethylsilacyclopentane, N-ethyl-aza-2,2-dimethylsilacyclopentane, N-n-propyl-aza-2,2-dimethylsilacyclopentane, N-n-butyl-aza-2,2-dimethylsilacyclopentane, N-methyl-aza-2,2-diethylsilacyclopentane, N-ethyl-aza-2,2-diethylsilacyclopentane, N-n-propyl-aza-2,2-diethylsilacyclopentane, N-n-butyl-aza-2,2-diethylsilacyclopentane, N-methyl-aza-2,2-dipropylsilacyclopentane, N-ethyl-aza-2,2-dipropylsilacyclopentane, N-n-propyl-aza-2,2-dipropylsilacyclopentane, N-n-butyl-aza-2,2-dipropylsilacyclopentane, N-methyl-aza-2,2-dibutylsilacyclopentane, N-ethyl-aza-2,2-dibutylsilacyclopentane, N-n-propyl-aza-2,2-dibutylsilacyclopentane, N-n-butyl-aza-2,2-dibutylsilacyclopentane, N-methyl-aza-2-ethyl-2-methylsilacyclopentane, N-ethyl-aza-2-butyl-2-ethylsilacyclopentane, N-n-propyl-aza -2-methyl-2-propylsilacyclopentane, N-n-butyl-aza-2-propyl-2-ethylsilacyclopentane, N-methyl-aza-2-butyl-2-methylsilacyclopentane, N-ethyl-aza-2-propyl-2-ethylsilacyclopentane, N-n-propyl-aza-2-butyl-2-propylsilacyclopentane, and N-n-butyl-aza -2-methyl-2-ethylsilacyclopentane.

12. The method of claim 9l where the functionalizing compound is selected from the group consisting of N-methyl-aza-2-methoxy-2-methylsilacyclopentane, N-ethyl-aza-2-methoxy-2-methylsilacyclopentane, N-n-propyl aza-2-methoxy-2-methylsilacyclopentane, N-n-butyl-aza-2-methoxy-2-methylsilacyclopentane, N-methyl-aza-2-ethoxy-2-ethylsilacyclopentane, N-ethyl-aza-2-ethoxy -2-ethylsilacyclopentane, N-n-propyl-aza-2-ethoxy-2-ethylsilacyclopentane, N-n butyl-aza-2-ethoxy-2-ethylsilacyclopentane, N-methyl-aza-2-propoxy-2-propylsilacyclopentane, N-ethyl-aza-2-propoxy-2-propylsilacyclopentane, N-n-propyl aza-2-propoxy-2-propylsilacyclopentane, N-n-butyl-aza-2-propoxy-2-propylsilacyclopentane, N-methyl-aza-2-propoxy-2-butylsilacyclopentane, N-ethyl-aza-2-propoxy -2-butylsilacyclopentane, N-n-propyl-aza-2-propoxy-2-butylsilacyclopentane, N n-butyl-aza-2-propoxy-2-butylsilacyclopentane, N-methyl-aza-2-ethoxy-2-methylsilacyclopentane, N-ethyl-aza-2-butoxy-2-ethylsilacyclopentane, N-n-propyl-aza-2-methoxy -2-propylsilacyclopentane, N-n-butyl-aza-2-propoxy-2-ethylsilacyclopentane, N methyl-aza-2-butoxy-2-methylsilacyclopentane, N-ethyl-aza-2-propoxyl-2-ethylsilacyclopentane, N-n-propyl-aza-2-butoxy-2-propylsilacyclopentane, and N-n-butyl-aza -2-methoxy-2-ethylsilacyclopentane.

13. The method of claim 9, where the functionalizing compound is N-methyl-aza-2,2-dimethoxysilacyclopentane.

14. The method of claim 1, said step of reacting occurs within a solvent.

15. The method of claim 1, where $R^9$ is a hydrocarbyl group selected from the group consisting of alkyl, cycloalkyl, substituted cycloalkyl, alkenyl, cycloalkenyl, substituted cycloalkenyl, aryl, allyl, substituted aryl, aralkyl, alkaryl, and alkynyl groups.

* * * * *